United States Patent [19]

Satoh et al.

[11] 4,352,473
[45] Oct. 5, 1982

[54] TAPE CASSETTE

[75] Inventors: Ken Satoh, Akigawa; Seizo Watanabe; Sinichi Saitou, both of Hachioji; Toshikazu Kato, Hino; Ken Ohshima; Tsutomu Shibata, both of Hachioji; Kenji Kimura, Tachikawa, all of Japan

[73] Assignee: Olympus Optical Co., Ltd., Tokyo, Japan

[21] Appl. No.: 199,324

[22] Filed: Oct. 21, 1980

[30] Foreign Application Priority Data

Oct. 26, 1979 [JP] Japan .......................... 54-148555[U]

[51] Int. Cl.³ .......................... G03B 1/04; G11B 15/32
[52] U.S. Cl. .................................................. 242/199
[58] Field of Search ............................ 242/199–200, 242/76; 360/96, 132

[56] References Cited

U.S. PATENT DOCUMENTS 3,096,038 7/1963 Fundingsland ................. 242/200
3,423,038 1/1969 Katz et al. ....................... 242/199
4,110,018 8/1978 Finnemore ................... 242/199 X Primary Examiner—Leonard D. Christian
Attorney, Agent, or Firm—Frishauf, Holtz, Goodman & Woodward

[57] ABSTRACT

A tape cassette according to this invention comprises at least three guide rollers disposed inside the housing of the tape cassette. The at least three guide rollers define a position of the magnetic recording tape of the tape cassette relative to the housing across the thickness thereof while the tape is travelling from one of two reel hubs held by the housing along a path extending adjacent a front wall of the housing, the front wall having openings for the insertion of a magnetic head and a pinch roller.

8 Claims, 4 Drawing Figures

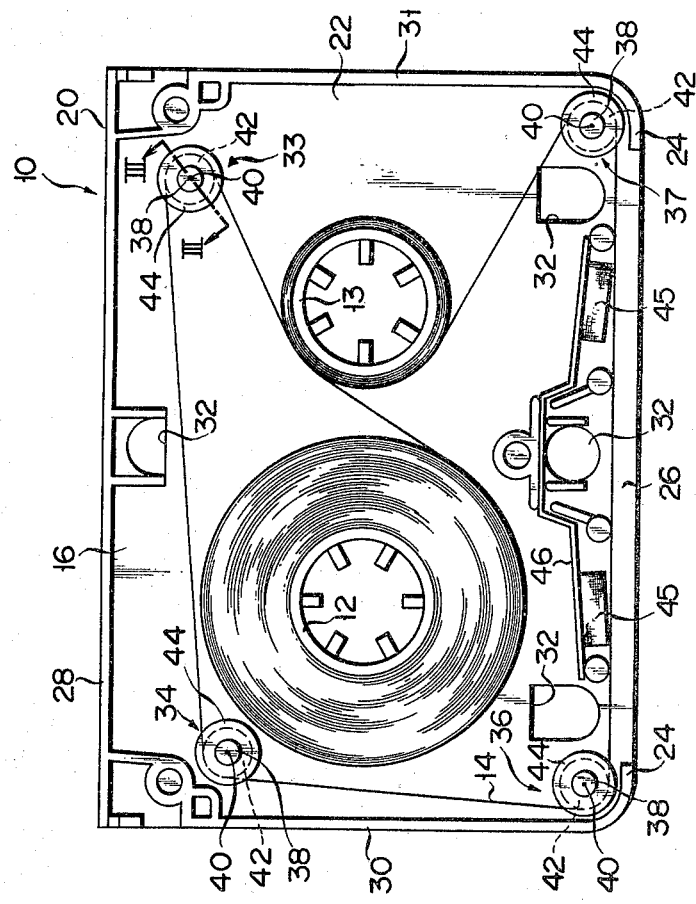

TAPE CASSETTE

BACKGROUND OF THE INVENTION

This invention relates to a tape cassette provided with a pair of reel hubs, a magnetic recording tape wound around the reel hubs, and a housing containing the reel hubs and the magnetic recording tape, and more specifically to a tape cassette provided with magnetic recording tape guide means for controlling the running direction of the magnetic recording tape travelling from one of the reel hubs to the other and for controlling the position of the tape relative to the housing across the thickness thereof.

A housing of a prior art tape cassette includes a pair of spaced apart holding plates disposed in parallel with the each other, a front wall coupling the holding plates and having openings for the insertion of a magnetic head and a pinch roller, a rear wall facing the front wall and coupling the holding plates, and a pair of side walls facing each other and coupling the holding plates and the front and rear walls. Further, a magnetic recording tape guide means of the prior art tape cassette includes a first tape guide member mounted on one of the two holding plates in the vicinity of the point of intersection between one of the two side walls and the front wall, and a second tape guide member mounted on one of the holding plates in the vicinity of the point of intersection between the other of the side walls and the front wall. A magnetic recording tape fed out from one of the two reel hubs contained in the housing to the other is first guided in its running direction by the first tape guide member, and travels toward the second tape guide member. Namely, the tape runs along the front wall of the housing between the first and second tape guide members. Then, the magnetic recording tape is guided in its running direction by the second tape guide member, travels to the other reel hub, and is wound thereon. At the same time, the magnetic recording tape is defined in its position relative to the housing across the thickness thereof by the first and second tape guide members.

When the prior art cassette is mounted on a magnetic recording tape operation apparatus, such as a tape recorder, and the magnetic recording tape is driven from one of the reel hubs to the other, a magnetic head comes in contact with the tape between the first and second tape guide members. Also, the magnetic recording tape is touched by a tape guide member of the magnetic recording tape operating apparatus in the vicinity of the magnetic head. The tape guide member of the apparatus defines the position of the tape relative to the housing across the thickness thereof.

In such prior art cassette, the path of the magnetic recording tape between the supply-side reel hub and the magnetic head is relatively short. In such short tape path, moreover, the magnetic recording tape is defined in its position relative to the housing across the thickness thereof by only the two tape guide members. The use of such few tape guide members in the short path will change the relative position of the tape suddenly. The sudden change of the tape position will produce excessive torsional stress at the contact portions of the magnetic recording tape which are contacted with the two guide members. The excessive torsional stress will distort or damage the tape. Further, the sudden change of the tape position will reduce the accuracy regarding the definition of the tape position. The reduction of the accuracy will shift the position of a track of the magnetic recording tape. In reproducing information from the tape track by using the magnetic head after recording the information on the tape track by means of the magnetic head, the shifting of the track position will distort the information to be reproduced.

SUMMARY OF THE INVENTION

The object of this invention is to provide a tape cassette provided with tape guide means capable of highly accurately defining the position of a magnetic recording tape relative to a housing across the thickness thereof without subjecting the tape to excessive torsional stress.

BRIEF DESCRIPTION OF THE DRAWINGS

FIG. 2 is a plan view of the tape cassette of FIG. 1 cleared of its upper half section;

DETAILED DESCRIPTION OF THE PREFERRED EMBODIMENTS

Figure 1:
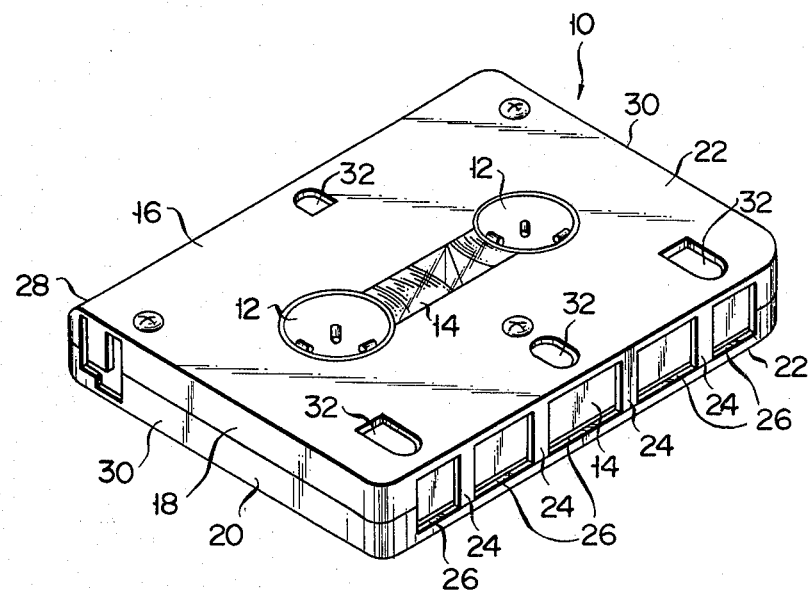
FIG. 1 is a perspective view of a tape cassette according to an embodiment of this invention.

FIG. 1 shows a tape cassette 10 according to an embodiment of this invention. As shown in FIG. 1, the tape cassette 10 is provided with a pair of reel hubs 12 and 13, a magnetic recording tape 14 wound around the reel hubs 12 and 13, and a housing 16 containing the reel hubs 12 and 13 and the magnetic recording tape 14. In this embodiment, the housing 16 has the same external configuration and dimensions as those of the housing of a known tape cassette called a "microcassette". The housing 16 comprises an upper half section 18 and a lower half section 20.

FIG. 2 shows the tape cassette 10 without the upper half section 18.

As shown in FIGS. 1 and 2, the housing 16 includes a pair of spaced apart holding plates 22 disposed in parallel with each other. The holding plates 22 are provided with a front wall 24 coupling these plates, and openings 26 for the insertion of a magnetic head and a pinch roller are provided in the front wall 24. Further, the holding plates 22 are provided with a rear wall 28 facing the front wall 24 and coupling the holding plates 22. The holding plates 22 and the front and rear walls 24 and 28 are connected with a pair of side walls 30 and 31 coupling these plates and walls and facing each other. As shown in FIG. 1, the reel hubs 12 and 13 are rotatably held by the holding plates 22. As shown in FIGS. 1 and 2, the two holding plates 22 are each provided with a plurality of holes 32 for the insertion of tape cassette locating pins and a capstan.

As shown in FIG. 2, a rear guide member 33 and a side guide member 34 are disposed between one reel hub 12 and the rear wall 28. The rear and side guide members 33 and 34 are mounted on the holding plate 22 of the lower half section 20. In this embodiment, moreover, the side guide member 34 is located in the vicinity of the point of intersection between one side wall 30 facing the reel hub 12 and the rear wall 28, that is, between the side wall 30 and the reel hub 12. On the other hand, the rear guide member 33 is located in the vicinity of the point of intersection between the other side wall 31 facing the other reel hub 13 and the rear wall 28, that is, between the rear wall 28 and the reel hub 12.

As shown in FIG. 2, a pair of front guide members 36 and 37 are disposed between the reel hubs 12 and 13 and the front wall 24. The front guide members 36 and 37 are mounted on the holding plate 22 of the lower half section 20. The front guide members 36 and 37 are located in the vicinity of the point of intersection between the side walls 30 and 31 and the front wall 24.

Figure 3:
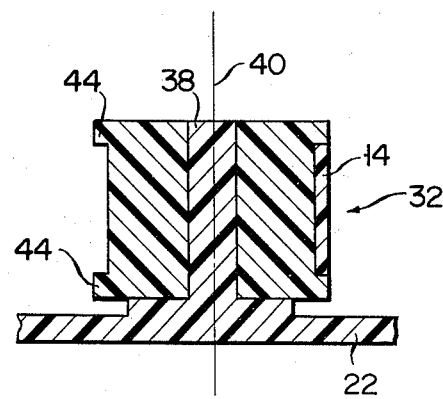
FIG. 3 is a sectional view as taken along line III—III of FIG. 2.

In this embodiment, the front guide members 36 and 37, the side guide member 34, and the rear guide member 33 each have a spindle 38 fixed to the holding plate 22 of the lower half section 20. As shown in FIGS. 2 and 3, the central axis 40 of the spindle 38 intersects the holding plates 22 at right angles thereto. As shown in FIG. 2, a roller body 42 is coaxially, rotatably mounted on the spindle 38. On the outer peripheral surface of the roller body 42, as shown in FIG. 3, there are formed a pair of outward flanges 44 spaced at a distance equivalent to the width of the magnetic recording tape 14 along the central axis 40. The magnetic recording tape 14 supplied from one reel hub 12 toward the other reel hub 13 is first laid on the outer peripheral surface of the roller body 42 of the rear guide member 33. Then, the magnetic recording tape 14 is laid successively on the roller body 42 of the side guide member 34, the roller body 42 of one front guide member 36 located in the vicinity of the point of intersection between the side wall 30 and the front wall 26, and the roller body 42 of the other front guide member 37. Finally, the tape 14 is taken up by the other reel hub 13.

Between the two front guide members 36 and 37, as shown in FIG. 2, the magnetic recording tape 14 is touched by head pads 45 which are attached to an elastic member 46 contained in the housing 16.

Figure 4:
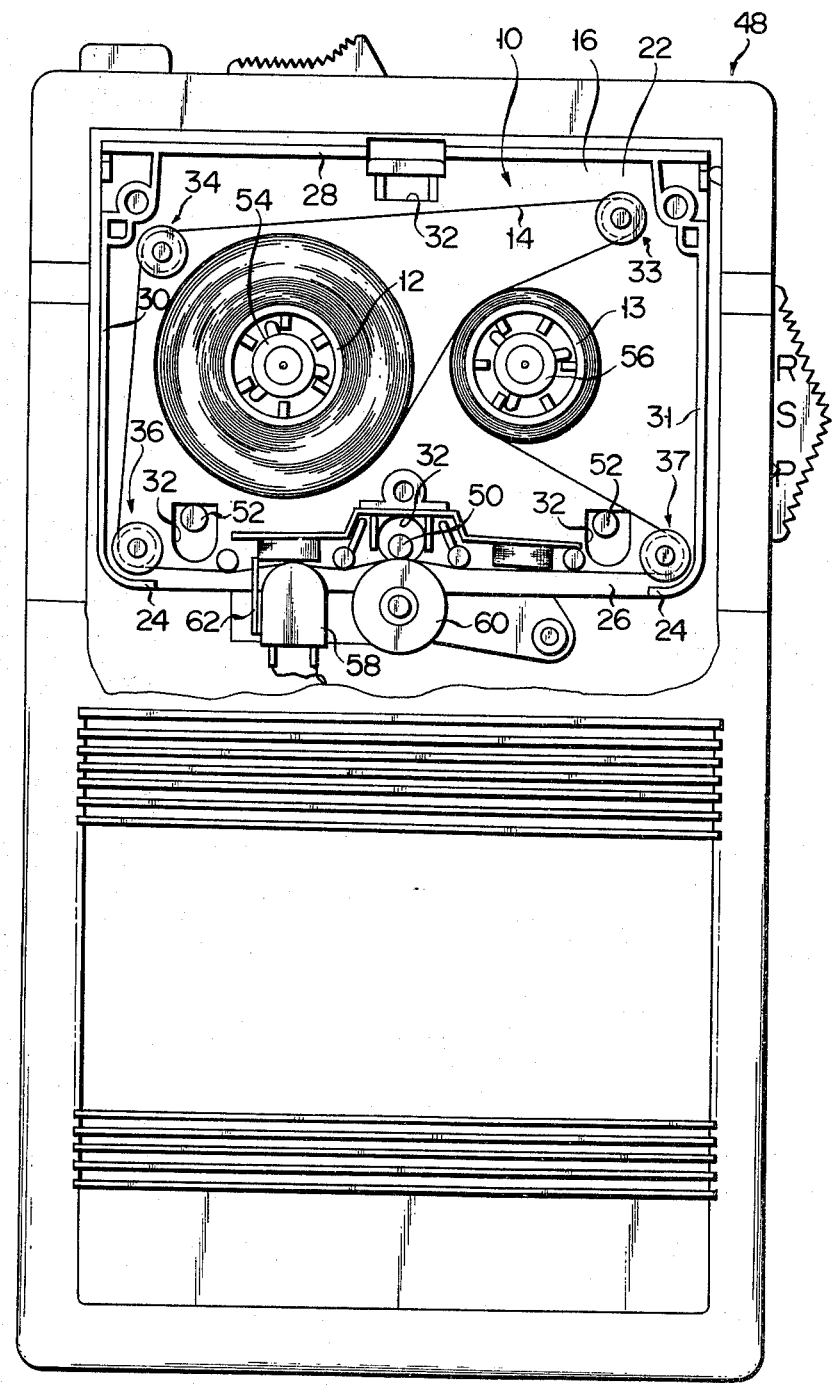
FIG. 4 is a plan view of the tape cassette of FIG. 2 mounted on a magnetic recording tape operating apparatus.

When the tape cassette 10 of the above-mentioned construction is mounted on a magnetic recording tape operating apparatus 48, as shown in FIG. 4, a capstan 50 and a plurality of tape cassette locating pins 52 attached to the magnetic recording tape operating apparatus 48 are inserted in the holes 32 for the insertion of a capstan and tape cassette locating pins of the housing 16. Further, a pair of reel shafts 54 and 56 engage the reel hubs 12 and 13, respectively. In this embodiment, the magnetic recording tape operating apparatus 48 is a tape recorded.

When a playback mode is set in the magnetic recording tape operating apparatus 48, a magnetic head 58 and a pinch roller 60 attached to the magnetic recording tape operating apparatus 48 are inserted in the openings 26 of the housing 16 of the tape cassette 10 to come in contact with the magnetic recording tape 14, as shown in FIG. 4. At this time, the pinch roller 60 holds the magnetic recording tape 14 in cooperation with the capstan 50. As shown in FIG. 4, moreover, a tape guide member 62 attached to the magnetic head 58 also comes in contact with the magnetic recording tape 14 between the pair of front guide members 36 and 37. The tape guide member 62, which is of a well-known construction, defines the location of the magnetic recording tape 14 relative to the housing 16 across the thickness thereof. In this embodiment, the magnetic recording tape 14 is wound around the pair of reel hubs 12 and 13 so as to be directed outwardly in the radial direction of the reel hub 12 as it runs in the counterclockwise direction of FIG. 4. Accordingly, the magnetic recording tape 14 is in slidable contact with a portion thereof that is wound around the reel hub 13 between the reel hub 12 and the rear guide member 33, as shown in FIG. 4.

In the aforementioned playback mode, the capstan 50 rotates in the counterclockwise direction of FIG. 4 at a fixed speed. Then, the reel hub 12 rotates in the counterclockwise direction of FIG. 4 to let out the magnetic recording tape 14 therefrom. The magnetic recording tape 14 let out from the reel hub 12 runs toward the rear guide member 33 to be led to a region between the reel hub 12 and the rear wall 28. Then, the magnetic recording tape 14 is defined in its position relative to the housing 16 across the thickness thereof, i.e. in the extending direction of the central axis 40, by the outward flanges 44 of the rear guide member 33, and is changed in its running direction by the roller body 42 of the member 33. Changed in its running direction by the rear guide member 33, the magnetic recording tape 14 travels toward the side guide member 34. Namely, as shown in FIG. 4, the magnetic recording tape 14 runs along the rear wall 28 of the housing 16 between the rear guide member 33 and the side guide member 34. Having reached the side guide member 34, the magnetic recording tape 14 is defined in its position relative to the housing 16 across the thickness thereof by the outward flanges 44 of the side guide member 34, and is changed in its running direction by the roller body 42 of the member 34. Changed in its running direction by the side guide member 34, the magnetic recording tape 14 travels toward the one front guide member 36. Namely, as shown in FIG. 4, the magnetic recording tape 14 runs along the side wall 30 between the side guide member 34 and the one front guide member 36. Having reached the one front guide member 36, the magnetic recording tape 14 is defined in its position relative to the housing 16 across the thickness thereof by the outward flanges 44 of the front guide member 36, and is changed in its running direction by the roller body 42 of the one front guide member 36. Changed in its running direction by the one front guide member 36, the magnetic recording tape 14 travels toward the other front guide member 37. Namely, as shown in FIG. 4, the magnetic recording tape 14 runs along the front wall 24 between the two front guide members 36 and 37, coming in contact with the tape guide member 62, magnetic head 58, and pinch roller 60 in this order. Immediately before touching the magnetic head 58, the magnetic recording tape 14 is defined in its position relative to the housing 16 across the thickness thereof, i.e. relative to the magnetic head 58, by the tape guide member 62. Having reached the other front guide member 37, the magnetic recording tape 14 is defined in its position relative to the housing 16 across the thickness thereof by the outward flanges 44 of the other front guide member 37, and is changed in its running direction by the roller body 42 of the other front guide member 37. Changed in its running direction by the other front guide member 37, the magnetic recording tape 14 is wound on the other reel hub 13 in the clockwise direction of FIG. 4.

In this embodiment, the rear guide member 33 is mounted on the holding plate 22 in the vicinity of the point of intersection between the rear wall 28 and the side wall 31. Accordingly, the portion of the magnetic recording tape 14 let out from the reel hub 12 is brought in contact with the portion of the tape 14 wound on the reel hub 13 between the reel hub 12 and the rear guide member 33, as shown in FIG. 4. However, the running speed and direction of the portion of the magnetic recording tape 14 travelling from the reel hub 12 toward the rear guide member 33 are substantially the same as those of the portion of the tape 14 wound on the reel hub 13. Therefore, the run of the magnetic recording tape 14 from the reel hub 12 toward the rear guide member 33 will never be prevented.

As described in detail herein, the tape cassette of this invention comprises a housing including a pair of spaced apart holding plates disposed in parallel with each other, a front wall coupling the holding plates and having openings for the insertion of a magnetic head and a pinch roller, a rear wall facing the front wall and coupling the holding plates, and a pair of side walls facing each other and coupling the holding plates and the front and rear walls, a pair of reel hubs rotatably held by the two holding plates, and a magnetic recording tape wound around the two reel hubs, the magnetic recording tape running from one of the reel hubs to the other along the front wall, and further comprises at least three guide rollers disposed inside the housing and defining a position of the magnetic recording tape relative to the housing across the thickness thereof while the tape is travelling from the one reel hub to the front wall.

Accordingly, the distance covered by the magnetic recording tape travelling from the one reel hub to the magnetic head can be made relatively long. In the relatively long tape path, moreover, there are provided a greater number of guide rollers than those of the prior art tape cassette. Thus, the tape cassette of this invention can highly accurately define the position of the magnetic recording tape relative to the housing across the thickness thereof without subjecting the tape to excessive torsional local stress.

According to a preferred embodiment of this invention, one of the three guide rollers is rotatably mounted on one of the two holding plates in the vicinity of the point of intersection between the front wall and one of the two side walls near the one reel hub, and the magnetic recording tape led from the one reel hub to the one of the three guide rollers is guided by the one guide roller in its running along the front wall. With such construction, the distance covered by the magnetic recording tape travelling from the one reel hub to the one guide roller can be made relatively great within the housing 16.

According to the preferred embodiment of this invention, moreover, one of the remaining two of the three guide rollers is located between the rear wall and the one reel hub and rotatably mounted on one of the two holding plates, and the other of the remaining two guide rollers is located between the one side wall and the one reel hub and rotatably mounted on one of the holding plates, so that the magnetic recording tape may be let out from the one reel hub toward the rear wall to be guided in its running direction by the one of the remaining two guide rollers, then led to the other of the remaining two guide rollers, and guided in its running direction by the other guide roller to be led to the one of the three guide rollers. With such construction, the distance covered by the magnetic recording tape travelling from the remaining two guide rollers to the one guide roller can be made relatively great within the housing 16.

According to the preferred embodiment of this invention, moreover, the one of the remaining two guide rollers is located in the vicinity of the point of intersection between the rear wall and the other of the two side walls near the other reel hub, and the other of the remaining two guide rollers is located in the vicinity of the point of intersection between the rear wall and the one side wall near the one reel hub, so that the magnetic recording tape let out from the one reel hub may run along the rear wall between the remaining two guide rollers and along the one side wall between the other of the remaining two guide rollers and the one of the three guide rollers. With such construction, a path of the magnetic recording tape 14 between the one reel hub 12 and the magnetic head 58 can substantially be maximized within the housing 16.

According to the preferred embodiment of this invention, furthermore, each of the three guide rollers includes a spindle intersecting the two holding plates substantially at right angles thereto and fixed on one of the holding plates, a roller body rotatably mounted on the spindle, and a pair of outward flanges formed on the outer peripheral surface of the roller body and spaced from each other at a distance equivalent to the width of the magnetic recording tape along the spindle. With such construction, the position of the magnetic recording tape 14 relative to the housing 16 across the thickness thereof, i.e. in the extending direction of the central axis 40 of the spindle 38, can be defined with high accuracy, and friction between the magnetic recording tape 14 and the rear and side tape guide members 33 and 34 can be reduced. Thus, the distance covered by the magnetic recording tape 14 is extended, as compared with the tape path of the prior art tape cassette, and the tape 14 can be smoothly run to reduce the possibility of wow or flutter despite the increased number of guide rollers used.

According to the preferred embodiment of this invention, furthermore, the magnetic recording tape is wound around both of the reel hubs in the same direction, and a portion of the magnetic recording tape travelling between the one reel hub and the one of the remaining two guide rollers is in contact with another portion of the tape wound on the other reel hub. With such construction, the distance covered by the magnetic recording tape 14 within the housing 16 can be made a little longer than the aforesaid substantially maximum tape path.

It is to be understood that the above-mentioned embodiment is for purpose of illustration only and is not intended as a definition of the limits of the invention, and that various changes and modifications may be effected by one skilled in the art without departing from the scope or spirit of the invention.

For example, the tape cassette 10 may be a Phillips-type tape cassette.

Moreover, the other front guide member 37 may be a pin fixed on one of the two holding plates 22.

Furthermore, the rear guide member 33 may be disposed substantially midway between the pair of side walls in the vicinity of the rear wall.

What we claim is:

1. In a tape cassette comprising a housing including a pair of spaced apart holding plates disposed in parallel with each other, a front wall coupling said pair of holding plates and having openings for the insertion of a magnetic head and a pinch roller, a rear wall facing said front wall and coupling said pair of holding plates, and a pair of side walls facing each other and coupling said pair of holding plates and said front and rear walls; a pair of reel hubs rotatably held by said pair of holding plates; and a magnetic recording tape wound around said pair of reel hubs, said magnetic recording tape running from one of said reel hubs and then along a path adjacent and along said front wall and then to the other of said reel hubs, the improvement wherein said tape cassette further comprises:

at least three guide rollers disposed inside said cassette housing and arranged to contact and guide the magnetic recording tape between said one reel hub and said path adjacent said front wall, said at least three guide rollers guiding the magnetic recording tape in a path to cross an imaginary line which intersects the rotation axes of said pair of reel hubs after the magnetic recording tape leaves said one reel hub, said guide rollers further including position defining means for defining a position of the magnetic recording tape relative to said cassette housing across the thickness of said cassette housing while said tape is traveling from said one reel hub to said path adjacent and along said front wall.

2. A tape cassette according to claim 1, wherein one of said at least three guide rollers is rotatably mounted on one of said pair of holding plates in the vicinity of the point of intersection between said front wall and one of said pair of side walls near said one reel hub, and said magnetic recording tape is fed from said one reel hub to said one of said at least three guide rollers and is guided by said one guide roller in its running along said path adjacent said front wall.

3. A tape cassette according to claim 2, wherein a second of said at least three guide rollers is located between said rear wall and said one reel hub and is rotatably mounted on one of said pair of holding plates, and a third of said at least three guide rollers is located between said one side wall and said one reel hub and is rotatably mounted on one of said pair of holding plates; said magnetic recording tape being led out from said one reel hub toward said rear wall and being in contact with and guided in its running direction by said second of said at least three guide rollers, then led to said third of said at least three guide rollers and being in contact with and guided in its running direction by said third guide roller, and then led to said one of said at least three guide rollers.

4. A tape cassette according to claim 3, wherein said second of said at least three guide rollers is located in the vicinity of the point of intersection between said rear wall and the other of said pair of side walls near said other reel hub, and said third of said at least three guide rollers is located in the vicinity of the point of intersection between said rear wall and the one side wall nearest said one reel hub, so that said magnetic recording tape led out from said one reel hub runs along said rear wall between said second and third of said at least three guide rollers and along said one side wall between said third of said at least three guide rollers and said one of said at least three guide rollers.

5. A tape cassette according to claim 4, wherein each of said at least three guide rollers includes a spindle intersecting said pair of holding plates substantially at right angles thereto and fixed on one of said holding plates, a roller body rotatably monted on said spindle, and a pair of outward directed flanges formed on the outer peripheral surface of said roller body and spaced from each other a distance substantially equal to the width of said magnetic recording tape along said spindle, said outward flanges comprising said position defining means.

6. A tape cassette according to claim 4 or 5, wherein said magnetic recording tape is wound around both of said pair of reel hubs in the same direction, and a portion of said magnetic recording tape travelling between said one reel hub and said second of said at least three guide rollers is in contact with another portion of said tape wound on said other reel hub.

7. A tape cassette according to claim 1 wherein said position defining means comprises a pair of outward directed flanges on each of said at least three guide rollers, said flanges of each of said at least three guide rollers being spaced apart a distance substantially equal to the width of said magnetic tape in the axial direction of said at least three guide rollers.

8. A tape cassette according to any one of claims 1, 2, 3, 4 or 5, further comprising an additional guide member arranged to contact and guide said magnetic tape from said path adjacent said front wall to said other reel hub, said other reel hub serving as a take up reel.

* * * * *